US009269972B2

(12) United States Patent
Paganelli

(10) Patent No.: US 9,269,972 B2
(45) Date of Patent: Feb. 23, 2016

(54) METHOD FOR DETECTING THE SEALED STATE OF A FUEL CELL

(75) Inventor: Gino Paganelli, Cottens (CH)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 771 days.

(21) Appl. No.: 13/505,287

(22) PCT Filed: Oct. 27, 2010

(86) PCT No.: PCT/EP2010/066261
§ 371 (c)(1),
(2), (4) Date: Jul. 12, 2012

(87) PCT Pub. No.: WO2011/051340
PCT Pub. Date: May 5, 2011

(65) Prior Publication Data
US 2012/0276465 A1 Nov. 1, 2012

(30) Foreign Application Priority Data
Oct. 30, 2009 (FR) ..................................... 09 57645

(51) Int. Cl.
*H01M 8/04* (2006.01)
*H01M 8/24* (2006.01)
*H01M 8/10* (2006.01)

(52) U.S. Cl.
CPC ........ *H01M 8/04097* (2013.01); *H01M 8/0491* (2013.01); *H01M 8/04201* (2013.01); *H01M 8/04231* (2013.01); *H01M 8/04388* (2013.01); *H01M 8/04395* (2013.01); *H01M 8/04447* (2013.01); *H01M 8/04559* (2013.01); *H01M 8/04664* (2013.01); *H01M 8/04753* (2013.01); *H01M 8/04776* (2013.01); *H01M 8/1002* (2013.01); *H01M 8/04104* (2013.01); *H01M 2008/1095* (2013.01); *Y02E 60/521* (2013.01)

(58) Field of Classification Search
None
See application file for complete search history.

(56) References Cited

U.S. PATENT DOCUMENTS

2006/0228601 A1* 10/2006 Yoshida .......................... 429/22
2008/0038595 A1* 2/2008 Buchi et al. ..................... 429/13
2008/0311439 A1* 12/2008 Paganelli ........................ 429/13
2009/0220832 A1 9/2009 Reiser et al.

FOREIGN PATENT DOCUMENTS

JP 2009 146651 7/2009
JP 2009146651 * 7/2009
WO WO 03/061046 7/2003
WO WO 2008/104865 9/2008
WO WO 2009/041271 4/2009

* cited by examiner

*Primary Examiner* — Patrick Ryan
*Assistant Examiner* — Christopher Domone
(74) *Attorney, Agent, or Firm* — Cozen O'Connor

(57) ABSTRACT

Procedure for detecting the sealing state of a fuel cell stack in which, as soon as the fuel cell stack is considered to be extinguished, the sum of the pressures in the anode circuit and in the cathode circuit equal to $P_1$ is recorded. After an additional period of time of 180 seconds, the sum of the pressures in the anode circuit and in the cathode circuit equal to $P_2$ is recorded. If $P_2$ is less than $P_1$, an alarm is triggered.

11 Claims, 3 Drawing Sheets

METHOD FOR DETECTING THE SEALED STATE OF A FUEL CELL

RELATED APPLICATIONS

This is a U.S. National Phase Application under 35 USC 371 of International Application PCT/EP2010/066261, filed on Oct. 27, 2010.

This application claims the priority of French patent application no.: 09/57645, filed Oct. 30, 2009, the entire content of which is hereby incorporated by reference.

FIELD OF THE INVENTION

The present invention relates to fuel cell stacks, in particular, but not exclusively, to fuel cell stacks of the type having an electrolyte in the form of a polymeric membrane (i.e. of the PEFC (Polymer Electrolyte Fuel Cell) type).

BACKGROUND OF THE INVENTION

It is known that fuel cell stacks produce electrical energy directly via an electrochemical redox reaction using hydrogen (the fuel) and oxygen (the oxidant) without passing via a mechanical energy conversion step. This technology seems promising, especially for motor vehicle applications. A fuel cell stack comprises in general the series combination of unitary elements each consisting essentially of an anode and a cathode separated by a polymeric membrane allowing ions to pass from the anode to the cathode.

It is very important to have a precise evaluation of the sealing state of the fuel cell, that is to say the sealing of the gas circuit at the anode (fuel gas circuit) and the sealing of the oxidant gas circuit (gas circuit at the cathode). This is because a gas leak will inevitably disturb the operation of the fuel cell stack and pollute the environment thereof, in particular if this is a fuel gas leak. As a consequence, the fuel cell stack may suffer a loss of power, a reduction in efficiency or premature ageing, and the operating conditions, for safe operation, may even be compromised.

Patent application WO 2003/061046 discloses an extinction procedure for a polymer electrolyte membrane fuel cell operating with air as oxidant gas. The procedure disclosed consists in maintaining the pressure difference between the anode and the cathode below an acceptable level. To do so, the air feed is maintained during extinction and the air pressure is controlled so as to follow the drop in pressure on the hydrogen side. However, maintaining the air feed risks causing a hydrogen starvation, which for stack survival is quite worrying. Moreover, the above document teaches no means for observing the sealing state of a fuel cell stack.

SUMMARY OF THE INVENTION

One object of the present invention is to be able to observe the sealing state of the fuel cell stack with respect to atmosphere, in particular after each extinction, in order to monitor and diagnose a fuel cell stack, without it being necessary to add equipment just for providing a monitoring function, that is to say equipment that is in no way necessary for the normal operation of the fuel cell stack.

One embodiment of the invention relates to a procedure for detecting the state of a fuel cell stack, the fuel cell stack being formed by stacking electrochemical cells each having an anode and a cathode on either side of a polymeric ion exchange membrane, the fuel cell stack having a fuel gas supply system on the anode side of the electrochemical cells and an oxidant gas supply system on the cathode side of the electrochemical cells, the procedure consisting, upon each shut-down of the fuel cell stack, in measuring the dynamic behaviour whereby the pressure in the anode circuit and the pressure in the cathode circuit evolve and, when said dynamic behaviour shows pre-identified characteristic signs, a warning signal indicating that the fuel cell stack requires inspection is activated.

The applicant has in fact observed that, when said dynamic behaviour shows pre-identified characteristic signs, precise examples of which will be given below, the fuel cell stack shows a loss of sealing, which may impair safety and reduce the efficiency and durability. An inspection is then necessary in order to examine more closely the degradation of the fuel cell stack so as thereafter to be able to take appropriate measures (repair or scrapping).

According to one aspect of the invention, to obtain an evaluation of the state of a fuel cell stack, a mathematical function combining the pressure in the cathode circuit with the pressure in the anode circuit is constructed. The variation over the course of time of this function, as a measurement of said dynamic behaviour whereby the pressure in the anode circuit and the pressure in the cathode circuit evolve, is observed.

Preferably, to implement the invention, the fuel cell stack comprises a pressurized oxygen supply, coming from an oxygen storage tank, and a device for filling with pressurized atmospheric air, together with a recycling circuit connected to the outlet of the cathode circuit of the fuel cell stack.

In the rest of the description, the invention is illustrated by considering a fuel cell stack supplied with pure oxygen as oxidant gas. This aspect however is not limiting, it being possible for the invention also to apply to fuel cell stacks supplied with ambient air. The embodiment described (supply with pure oxygen) is conducive to the compactness of the given fuel cell stack, this constituting a favourable embodiment for applications in transport vehicles, in particular in motor vehicles.

This application case means in practice designing a fuel cell stack that has substantially the same internal volume for the fuel gas supply circuit on the anode side of the electrochemical cells and for the oxidant gas supply circuit on the cathode side of the electrochemical cells. In this case, one appropriate simple mathematical function is the sum of the pressure in the cathode circuit and the pressure in the anode circuit, another function being the average of the pressure in the cathode circuit and the pressure in the anode circuit. Of course, it should be realized that, to implement one or other of the aforementioned mathematical functions (sum or average), the gas circuits on the anode side and on the cathode side should contain the same number of moles. If this is not the case, a person skilled in the art will know how to apply relevant adaptation coefficients or, more generally, will know how to choose a relevant mathematical function for collectively monitoring the sealing of both gas circuits of a fuel cell stack with respect to the atmosphere.

According to another aspect of the invention, the measurement or observation or evaluation of said dynamic behaviour starts as soon as the stack is completely shut down with residual pressures in the anode and cathode circuits that differ from atmospheric pressure. In this case, the procedure for detecting the state of a fuel cell stack is such that the pressure variation in said circuits over a predetermined time period $t_c$ is measured.

According to one aspect of the invention, to evaluate said dynamic behaviour, instead of measuring the pressure difference after a given time, the time to reach a given pressure difference is measured. The invention of course covers other ways of evaluating said dynamic behaviour.

Preferably, the procedure for detecting the sealing state of a fuel cell stack as explained above is preceded by a procedure for shutting down said fuel cell stack, the latter delivering an electrical voltage to an electrical power line (10), the shut-down procedure comprising the following actions:

(i) the supply of fuel gas and oxidant gas is cut off;

(ii) current continues to be drawn as long as an appropriate indicator indicates that the oxidant gas in the oxidant gas supply system has not been sufficiently consumed; and (iii) nitrogen-enriched gas is injected into the oxidant gas supply system.

The actions (i), (ii) and (iii) could all be concomitant. To make the following description better understood, the actions (ii) and (iii) are successive steps, the two actions (i) and (ii) being concomitant. It is also useful to provide, after the action (iii), a fuel gas suction step, as is also shown in the description of the shut-down procedure illustrating the invention.

By virtue of the shut-down procedure proposed above, the hydrogen diffuses into the cathode only very slowly through the polymeric ion-exchange membrane and after extinction, that is to say after all the oxygen has been consumed and the cathode circuit has been filled with nitrogen. Oxygen and hydrogen therefore never cohabit in significant amount. The hydrogen supply is interrupted right from the start of the procedure simultaneously or almost simultaneously with the cutting-off of the oxidant gas supply. Although the action of interrupting the fuel gas supply could be somewhat delayed relative to the action of interrupting the oxidant gas supply, it may not be significantly delayed. The following description is limited only to the case in which the supply of oxidant gas and the supply of fuel gas are interrupted simultaneously, which is the simplest procedure to control and gives entirely satisfactory results. All the residual hydrogen at the anode is parsimoniously used to guarantee the desired $H_2/N_2$ mixture.

It should be noted that the shut-down procedure proposed above extends to a fuel cell stack in which the additional fuel gas accumulation chamber could be placed at any point in the fuel gas supply circuit, that is to say at any point between the cut-off valve and the fuel cell stack, even in the recycling circuit, or in the circuit between the water separator and the ejector. However, it is advantageous to place it at a point in the circuit where the pressure is highest so as to reduce the volume thereof, as specified in the description of the above fuel cell stack.

In any case, as regards the electrolyte, the invention applies to fuel cell stacks of the type having an electrolyte in the form of a polymeric membrane (that is to say one of the PEFC type). The electricity generator and the shut-down procedure described below prove to be particularly suitable for being installed and implemented in a motor vehicle.

BRIEF DESCRIPTION OF THE DRAWINGS

The rest of the description serves to make all the aspects of the invention clearly understood by means of the appended drawings in which.

DESCRIPTION OF THE PREFERRED EMBODIMENTS OF THE INVENTION

For safety reasons, fuel cell stacks are generally equipped with an $H_2$ cut-off valve which remains closed during shutdowns. In this case, it is not possible to draw $H_2$ into the tank during the extinction procedure. The fuel cell stack must therefore function with only the residual hydrogen in its channels, ducts, internal dehumidifying reservoirs and other components of the supply line going from the safety valve to the actual fuel cell stack, these components being denoted hereafter in general as the supply circuit for the fuel cell stack.

Figure 1:
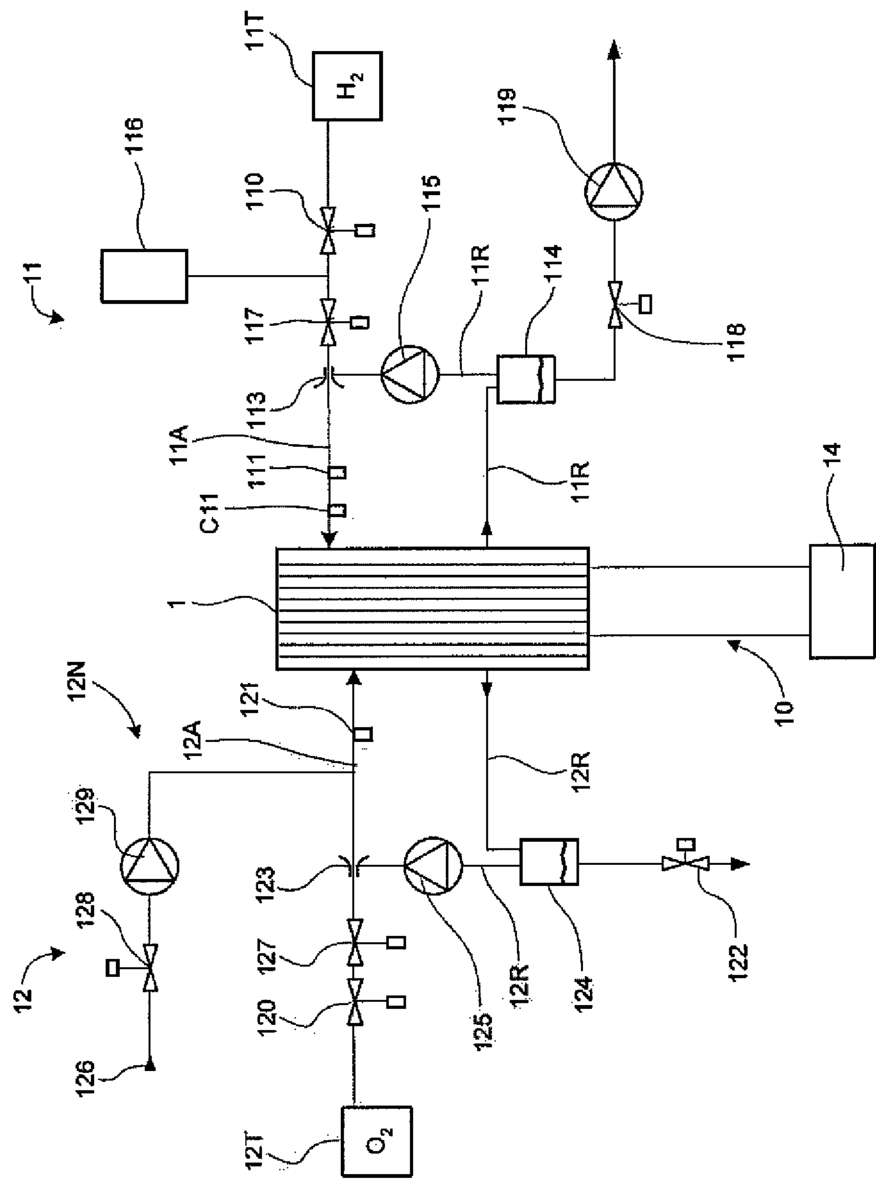
FIG. 1 is a diagram of an electricity generator using a fuel cell stack supplied with pure oxygen.

FIG. 1 shows a fuel cell stack 1 of the type having an electrolyte in the form of a polymeric membrane (i.e. of the PEFC or PEM (proton exchange membrane) type). The fuel cell stack 1 is supplied with two gases, namely the fuel (hydrogen stored or generated on board the vehicle) and the oxidant (pure oxygen), which gases supply the electrodes of the electrochemical cells. An electrical load 14 is connected to the fuel cell stack 1 via an electrical line 10. To simplify matters, FIG. 1 shows only the gas circuit components useful for understanding the invention.

Description of the Anode Circuit

The installation comprises a fuel gas supply circuit 11 on the anode side. A pure hydrogen ($H_2$) tank 11T is visible, this being connected to the inlet of the anode circuit of the fuel cell stack 1 by means of a supply line that passes via a cut-off valve 110, then via an ejector 113 and then via a fuel gas supply channel 11A terminating at the cathodes. A pressure probe 111 is installed in the supply channel 11A just before the inlet into the fuel cell stack 1. Forming part of the hydrogen (fuel) supply circuit 11 is a circuit 11 R for recycling the hydrogen not consumed by the fuel cell stack, said circuit being connected to the outlet of the anode circuit of the fuel cell stack 1. A water separator 114 is installed in the recycling circuit 11R. The ejector 113 and a recirculating pump 115 recycle the unconsumed hydrogen and mix it with fresh hydrogen coming from the tank.

An additional fuel gas accumulation chamber 116 is also visible, this being placed on the piping of the fuel gas supply circuit 11, between the cut-off valve 110 and the pressure regulating valve 117. The additional accumulation chamber is, in this preferred embodiment, placed at the point where the pressure is highest in the supply circuit, so as to lessen the volume thereof or, for the same volume, to stock a larger amount of hydrogen. It should be noted that the additional fuel gas accumulation chamber 116 could be placed at any point in the fuel gas supply circuit, that is to say at any point between the cut-off valve 110 and the fuel cell stack 1, even in the recycling circuit 11R or in the circuit between the water separator 114 and the ejector 113. However, it is advantageous to place it at a point in the circuit where the pressure is highest, so as to reduce the volume thereof.

A suction pump 119 and a cut-off valve 118 that are installed on a line venting to atmosphere and connected below the water separator 114, can also be seen. The connection at this point, shown in FIG. 1, makes it possible, by controlling the cut-off valve 118, to provide three functions, namely water discharging, purging and hydrogen suction. However, this embodiment detail is not limiting. To provide the more specific hydrogen suction function of the present invention, the line having the cut-off valve 118 could be branched off the line connecting the separator 114 to the recirculating pump 115.

A hydrogen concentration sensor C11 may advantageously be inserted into the anode circuit so as to check there is no hydrogen starvation during the extinction procedure and, where appropriate, to limit the injection of air by the booster pump (see description of the cathode circuit), which may occur for example if the hydrogen pressure is abnormally low and does not ensure the sufficient amount of hydrogen for completing the extinction procedure. Such a hydrogen sensor C11 is installed as shown in FIG. 1.

Description of the Cathode Circuit

The installation also includes an oxidant gas supply circuit 12 on the cathode side. A pure oxygen ($O_2$) tank 12T is visible, this being connected to the inlet of the cathode circuit of the fuel cell stack 1 by means of a supply line that passes via a cut-off valve 120, then via a pressure regulating valve 127, then via an ejector 123 and then via an oxidant gas supply channel 12A terminating in the cathodes. A pressure probe 121 is installed in the supply channel 12A just before the inlet into the fuel cell stack 1. Forming part of the oxygen supply circuit 11 is a circuit 12R for recycling the oxygen not consumed by the fuel cell stack, connected to the outlet of the cathode circuit of the fuel cell stack 1. A water separator 124 is installed in the recycling circuit 12R. The ejector 123 and a recirculating pump 125 recycle the unconsumed oxygen and mix it with fresh oxygen coming from the tank.

A purge valve 122 is connected to the bottom of the water separator 124. This valve thus provides two functions, removal of the water and venting of the oxygen circuit to atmosphere. As a variant, this purge valve 122 could be connected just at the gas outlet of the fuel cell stack 1, branched off the line between the fuel cell stack 1 and the water separator 124, if it is desired to vent the oxygen circuit to atmosphere independently of draining the water in the water separator 124. It goes without saying that, in all cases, the function of draining water from the water separator 124 and from the water separator 114 must be ensured.

The fuel cell stack according to the invention includes a filling device 12N, for filling the cathode circuit with pressurized atmospheric air. The filling device 12N comprises the following components: a line starting with an air intake orifice 126 and, installed on said line, a cut-off valve 128 and a booster pump 129, the line terminating in the oxygen supply circuit, just upstream of the fuel cell stack 1. We should point out that the atmospheric air filling device 12N could terminate at any point in the loop of the oxidant gas supply circuit 12, said loop being formed by the recycling circuit 12R and by the line connecting the ejector 123 to the fuel cell stack 1.

Description of a Preferred Extinction Procedure

The procedure described below makes it possible to extinguish the fuel cell stack so as to guarantee storage with a hydrogen/nitrogen mixture therein, without requiring a nitrogen bottle. This procedure is recommended because it terminates by naturally leaving the fuel cell stack with a pressure differential with respect to atmospheric pressure sufficient to be able to carry out the stack sealing state measurement. In addition, the procedure is conducive to stable conditions in terms of the nature of the gases and the temperature, thereby guaranteeing better repeatability of the stack sealing state measurement.

The shut-down procedure is essentially made up of 3 phases, resulting from various commands that are explained:

1$^{st}$ phase: residual oxygen consumption phase, which occurs upon cutting off the fuel gas supply and oxidant gas supply, and by drawing a current $I_s$ at the terminals of the fuel cell stack. This current draw $I_S$ is maintained as long as an appropriate indicator indicates that the oxidant gas in the oxidant gas supply system has not been sufficiently consumed. An appropriate indicator is for example the pressure in the cathode circuit;

2$^{nd}$ phase: neutralization phase that occurs when filling the cathode circuit with nitrogen. In the embodiment described here, the nitrogen is that of the atmospheric air. Forced injection of atmospheric air then takes place, thereby again introducing a little oxygen, the consumption of which must be controlled; and 3$^{rd}$ phase, which is optional, during which, after the electrochemical processes have been completely shut down, any excess fuel gas is forcibly removed (here, forced suction of the excess hydrogen). It should be emphasized that, by virtue of the invention, this suction takes place only after the fuel cell stack has been brought into a state in which the precautions for avoiding insufficient supply of hydrogen, the serious consequences of which are known, have been taken.

Figure 2:
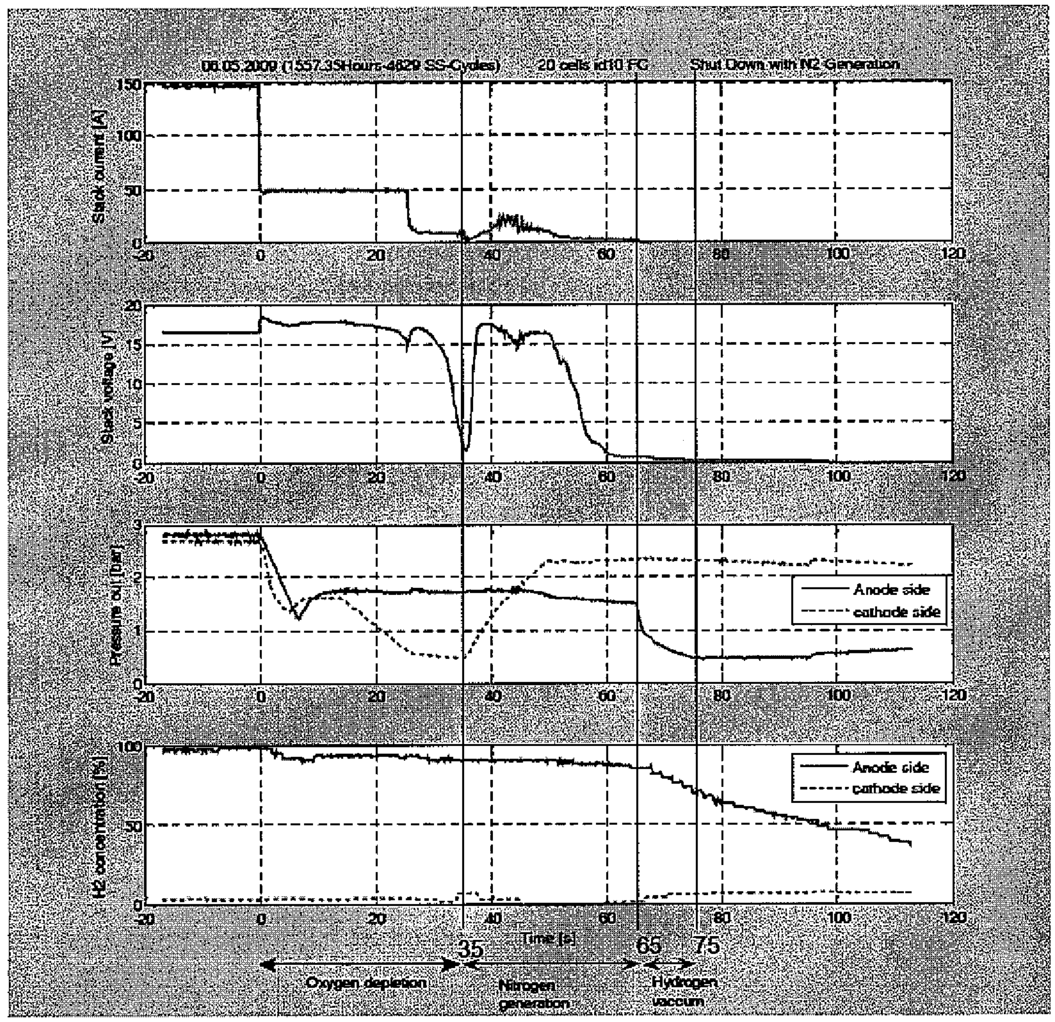
FIG. 2 shows the behaviour of various parameters during the extinction of a fuel cell stack.

FIG. 2 illustrates the sequence of the three phases during a shut-down actually measured on a fuel cell stack comprising twenty cells having an active area of 300 $cm^2$, operating with pure oxygen. The x-axis indicates the time in seconds, with as reference (0) the instant when the shut-down procedure starts. This figure shows the variation of the following quantities as a function of time during a shut-down with nitrogen generation:

Curve 1, the y-axis of which is labelled "stack current [A]", showing the current drawn from the fuel cell stack, expressed in amps;

Curve 2, the y-axis of which is labelled "stack voltage [V]", showing the total electrical voltage across the terminals of the fuel cell stack, expressed in volts;

Curve 3, the y-axis of which is labelled "pressure out [bar]", showing the pressure within the anode compartment (hydrogen: solid line) and in the cathode compartment (oxygen: dotted line), expressed in bara; and Curve 4, the y-axis of which is labelled "H2 concentration [%]", showing the hydrogen concentration in the anode compartment (hydrogen: solid line) and in the cathode compartment (oxygen: dotted line), expressed in %.

During the first phase of the extinction (0 to 35 s, marked "oxygen depletion" in FIG. 2), starting from the moment when the oxygen supply is cut off (by closing the cut-off valve 120 at the same instant that the cut-off valve 110 is closed, cutting off the hydrogen supply), the residual pure oxygen in the fuel cell stack is consumed by drawing a current. As the first curve indicates, this current is firstly established at 50 A and it is then reduced at the same time that some of the cells of the fuel cell stack start to drop in voltage and is finally stopped at 35 s when the voltage of the fuel cell stack approaches 0 V. The third curve indicates that the pressure in the oxygen compartment drops to less than 500 mbara (as is usual in the field of fuel cell stacks, "mbara" means "millibar absolute", the final letter "a" denoting "absolute"). However, despite the consumption associated with current production, the hydrogen pressure remains at 1.75 bara because of the presence of the additional fuel gas accumulation chamber 116.

As already emphasized in the introductory part of this patent application, the extinction procedure according to the invention may also apply to fuel cell stacks supplied with ambient air. To implement the shut-down procedure proposed by the invention for a fuel cell stack supplied with air, unlike the usual scheme for supplying such a fuel cell stack, the oxidant gas circuit must include a loop for circulating the air not consumed by the fuel cell stack, at least during the shut-down procedure. Therefore forming part of the air supply circuit 11 is a recycling circuit 12R for recycling the air not consumed by the fuel cell stack, connected to the outlet of the cathode circuit of the fuel cell stack 1, before a return and a direct connection (with no ejector nor a water separator, which are unnecessary in this configuration) to the supply line.

Let us return to the description of the shut-down procedure for a fuel cell stack supplied with pure oxygen. At the time 35 s ("35" on the time axis in FIG. 2), the air booster pump 129 is activated in order to pressurize the cathode circuit to a constant pressure of 2.2 bara (parameter 1), which is reached at 50 s. The oxygen thus supplied causes the fuel cell stack voltage to rise again. A current is drawn once more until the voltage of the fuel cell stack again becomes zero. In the meantime, the booster pump 129 is monitored so as to keep a constant pressure.

Incidentally, it should be remembered that all the curves detailed below relate to a fuel cell stack supplied with pure oxygen as oxidant, the nitrogen-enriched gas being the atmospheric air. However, it should be pointed out that, on the one hand, the nitrogen-enriched gas could be pure nitrogen and that, of course, in this case, the curves would have a different appearance after the instant "35 seconds" since the nitrogen injection would not be accompanied by a new supply of oxygen.

Let us return to the case described, namely the case of a fuel cell stack supplied with pure oxygen as oxidant. As the current is being consumed, the air present at the cathode becomes increasingly depleted in oxygen before finally containing only predominantly nitrogen, as revealed by the voltage across the terminals of the fuel cell stack becoming zero at the 65 s instant.

At this moment (65 seconds after the oxygen (120) and hydrogen (110) supplies have been cut off), the air booster pump 129 is stopped and the hydrogen suction pump 119 is activated, so as to remove the excess hydrogen. The suction pump 119 remains activated until the hydrogen pressure reaches 0.5 bars (parameter 2). This pressure is reached at the 75 s instant. The procedure is then terminated, the booster pump 129 and the suction pump 119 are stopped and the cut-off valves 118 and 128 are closed.

Throughout the entire extinction procedure, the recirculating pump 125 on the cathode side is kept in operation so as to ensure good homogeneity of the gas and to ensure complete consumption of the oxygen, preventing the appearance of zones with a higher oxygen concentration locally. The recirculating pump 115 on the anode side is also kept in operation so as to avoid any local hydrogen starvation. Throughout the extinction period, hydrogen starvation is avoided as the hydrogen consumption shown by the fourth curve indicates. The concentration remains above 85% in the anode circuit until the 65 second instant, when the hydrogen suction starts.

In the procedure described above, the first two phases (residual oxygen consumption and neutralization by means of nitrogen injection) take place in succession. However, they could just as well be concomitant. For greater rapidity of extinction, it is desirable to make them occur simultaneously. The final phase (excess hydrogen suction) is not always essential. The hydrogen buffer tank may in fact be designed so that the procedure terminates with the desired amount of hydrogen as explained below.

The internal volume of the fuel gas supply circuit 11 is designed to be greater than the internal volume of the oxidant gas supply circuit 12 and, in normal operation, the pressure within the oxidant gas supply circuit 12 and the pressure within the fuel gas supply circuit 11 are such that, given the internal volume of the oxidant gas supply circuit 12 and the internal volume of the fuel gas supply circuit 11, the number of moles of fuel gas always available at the start of the extinction process in the fuel gas supply circuit is greater than or equal to twice the number of moles of oxygen consumed in the oxidant gas supply circuit during the entire extinction procedure, that is to say until the cathode circuit is essentially filled with nitrogen at the desired pressure.

Thus, in a simple adaptation to be calculated and implemented, it is possible to ensure that the fuel gas supply circuit always contains sufficient gas, for the extinction of the fuel cell stack to result from the oxygen in the oxidant gas supply circuit being exhausted.

Let us see how to calculate the volumes of the anode circuit 12 and the cathode circuit 11. Let $m_{o2}$ be the amount of oxygen, expressed for example in moles, that has to be completely consumed over the entire extinction. This is the residual oxygen in the cathode circuit at the start of extinction less the amount that it is possible to purge, plus the amount which is introduced with the air introduced by the booster pump 129 to generate the nitrogen.

Since the gas consumption is twice as high on the hydrogen side, the volumes of the anode and cathode circuits must be sized so as to guarantee that:

$$m_{h2} \geq 2 \times m_{o2} + \mathrm{res}_{h2}$$

where $m_{h2}$ is the amount of hydrogen, expressed in moles, available at the start of extinction in the internal volume of the fuel gas supply circuit (pipes, channels, bipolar plates, supply line downstream of the cut-off valve 110) and $\mathrm{res}_{h2}$ is the desired amount of residual hydrogen, also expressed in moles. The amount of hydrogen $m_{h2}$ finally necessary will be obtained by adjusting the volume of the additional fuel gas accumulation chamber 116.

The amounts $m_{o2}$ and $m_{h2}$ are admittedly linked to the volume of the corresponding circuits that it is necessary to dimension, but they also depend on the pressure prevailing therein. This is a simplified approach since it would normally be necessary also to take account of the temperature of the gas and the nonlinearity of the hydrogen density as a function of the pressure. However, taking the pressure into account proves to be sufficient for the desired precision. The volumes have to be calculated for the most unfavourable pressure and temperature conditions that may be encountered, that is to say the minimum possible pressure in the hydrogen circuit at the start of extinction and the maximum possible residual pressure in the oxygen circuit.

However, in the case of a supply pressure variation, the execution of the procedure with an excess of hydrogen and a final suction guarantees that there is no hydrogen starvation and also better reproducibility of the final conditions.

Figure 3:
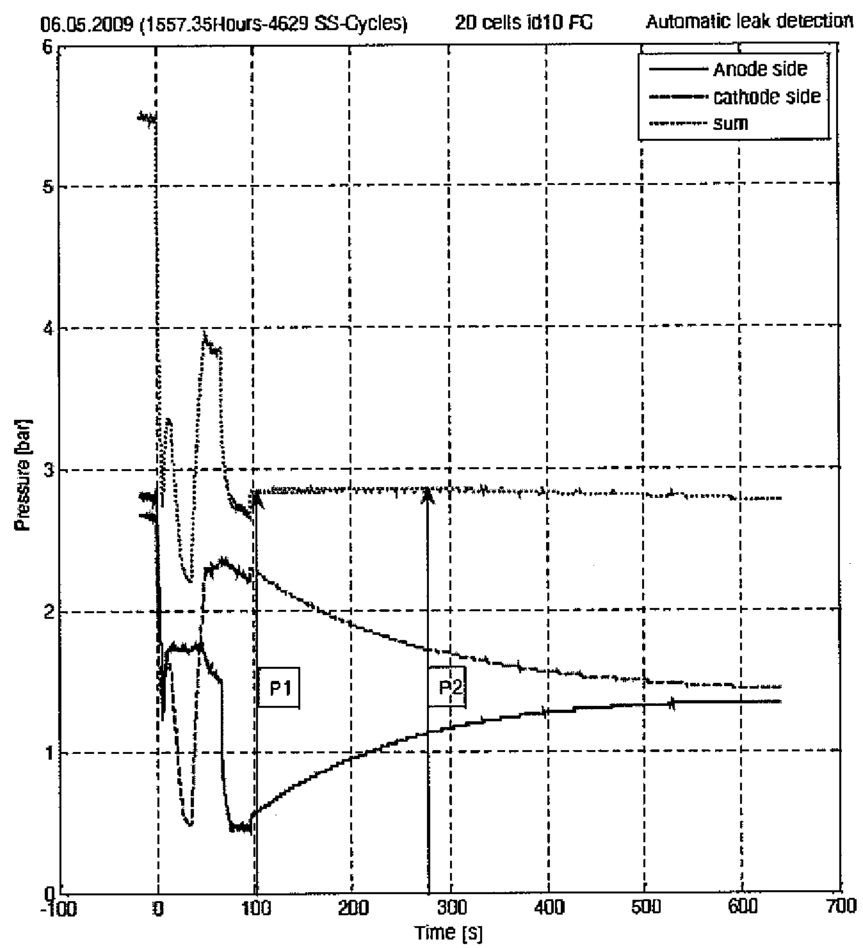
FIG. 3 shows the behaviour of the pressures after an extinction and illustrates the principle of measuring the sealed state of the stack.

Referring to FIG. 3, giving the variation in the pressures on the anode side and the cathode side over a longer period than in FIG. 2, comprising the extinction procedure described above and extending for some 10 minutes or so thereafter. At the end of the extinction procedure (about 100 seconds after the oxygen and hydrogen supplies have been cut off), the pressures in the anode compartment (continuous line) and the cathode compartment (long dotted line) are different from atmospheric pressure, in the example above 2.2 bara at the cathode and 0.5 bara at the anode. It may be seen that these two pressures converge on a common equilibrium pressure which is established at about 1.3 bara after 10 minutes, because of the permeability of the membranes separating the two compartments. However, it may be seen that the algebraic sum of the two pressures represented by the short dotted curve remains substantially constant, provided that the stack is properly sealed with respect to the atmosphere. Thus, if a check is made as soon as the fuel cell stack is considered to have been extinguished, the sum of the pressures in the anode circuit and the cathode circuit equal to $P_1$ is recorded. Thereafter, the sum of the pressures, in the anode circuit on the one hand and the cathode circuit on the other, will remain substantially the same, a sign that said circuits are properly sealed. After an additional period of time $t_c$ of 180 seconds, the sum of the pressures in the anode circuit and the cathode circuit equal to $P_2$ is recorded, where $P_2$ is practically the same as $P_1$.

Thus, it may be seen that a procedure can be carried out for detecting the state of a fuel cell stack in which the variation over the course of time of said mathematical function, here the algebraic sum, is recorded, and an alarm is triggered when the pair of values consisting of the time and the value of the function associated with said time exceeds a predetermined threshold. The pressure variation in said circuits over a predetermined time period $t_c$ is measured and a mathematical function combining the values of the pressure in said circuits is calculated. A warning is then given when the function is below a warning threshold at the end of a predetermined time period.

In practice, for a fuel cell stack of the PEFC type having a total cumulative active area of around 5000 $cm^2$, a volume of the anode and cathode circuits of the order of 1 litre and an average pressure differential relative to atmosphere at the end of extinction of about 500 mbar, experimental observations provide the following good practice rules: a warning threshold is to be activated when the sum of the anode and cathode pressures drops by 240 mbar in 3 minutes at a temperature of 70° C. Beyond this, a shut-down threshold may be set when the sum of the anode and cathode pressures drops by 300 mbar in 3 minutes at a temperature of 70° C. When the shut-down threshold level is reached, functioning of the stack is prohibited (for example by a program in the central control unit) and a maintenance action is made necessary. The seals at various places in a fuel cell stack are often the cause of sealing deficiencies. To identify the origin of the leak during the maintenance operation, one method consists in pressurizing the stack with an inert gas, preferably nitrogen, at a pressure close to the nominal operating pressure, and then in spraying a foaming product commonly used for detecting leaks onto the outside of the stack in order to locate the origin of the leak.

As regards the nature of the gases and the pressure, the shut-down procedure described above provides correct conditions and allows very good repeatability to be achieved, namely pure hydrogen at the anode at a pressure of 500 mbara and pure nitrogen at the cathode at a pressure of 2.2 bars. It is necessary to ensure that the gases present do not allow any electrochemical activity, which would make the pressure-variation measurement of the state of the stack inoperable. It is also clearly understood that the anode and cathode circuits must be closed during the measurement so that there is no gas exchange with the ambient environment or with the tanks, something which would completely falsify the measurement of the stack state. This means that the valves 128, 122, 120, 127, 118, 110 and 117 must be closed.

It is obvious that the gas pressure in the anode and cathode circuits must differ from atmospheric pressure, otherwise it would not be possible to observe the pressure variation due to leaks with respect to atmosphere. If the internal pressure is below atmospheric pressure, a leak in the circuit in question results in a rise in pressure, and vice versa.

Furthermore, the recirculating pumps 115 and 125 and the booster pump 129 must be shut down so as not to disturb the measurement.

The invention claimed is:

1. A procedure for detecting the state of a fuel cell stack, the fuel cell stack being formed by stacking electrochemical cells each having an anode and a cathode on respective sides of a polymeric ion-exchange membrane, the fuel cell stack having a fuel gas supply circuit on the anode side of the electrochemical cells and an oxidant gas supply circuit on the cathode side of the electrochemical cells, wherein the procedure comprises, upon each shut-down of the fuel cell stack, measuring an algebraic sum of a pressure in the anode circuit and a pressure in the cathode circuit over time and, if said algebraic sum drops below a threshold, activating a warning signal indicating that the fuel cell stack requires inspection.

2. The procedure for detecting the sealing state of a fuel cell stack according to claim 1, preceded by a procedure for shutting down said fuel cell stack, the latter delivering an electrical voltage to an electrical power line, the shut-down procedure comprising the following actions:

(i) the supply of fuel gas and oxidant gas is cut off;

(ii) current continues to be drawn as long as an appropriate indicator indicates that the oxidant gas in the oxidant gas supply circuit has not been sufficiently consumed; and (iii) nitrogen-enriched gas is injected into the oxidant gas supply circuit.

3. The procedure for detecting the sealing state of a fuel cell stack according to claim 1, for a fuel cell stack comprising an oxidant gas supply circuit on the cathode side of the electrochemical cells, the oxidant gas supply circuit comprising at the same time a cut-off valve, placed at the outlet of an oxygen storage tank, and a device for filling with pressurized atmospheric air, and a recycling circuit connected to an outlet of the cathode circuit of the fuel cell stack, together with a water separator, before a return and a connection to the oxidant gas supply line.

4. The procedure for detecting the sealing state of a fuel cell stack according to claim 2, wherein the actions (i), (ii) and (iii) are concomitant.

5. The procedure for detecting the sealing state of a fuel cell stack according to claim 2, wherein the actions (ii) and (iii) are successive steps, the two actions (i) and (ii) being concomitant.

6. The procedure for detecting the sealing state of a fuel cell stack according to claim 2, which further includes, after the action (iii), a fuel gas suction step.

7. The procedure for detecting the sealing state of a fuel cell stack according to claim 2, for a fuel cell stack supplied with pure oxygen as oxidant, the nitrogen-enriched gas being atmospheric air.

8. The procedure for detecting the sealing state of a fuel cell stack according to claim 2, wherein the action of interrupting the fuel gas supply is delayed relative to the action of interrupting the oxidant gas supply.

9. The procedure for detecting the sealing state of a fuel cell stack according to claim 2, wherein the supply of oxidant gas and the fuel gas supply are interrupted simultaneously.

10. The procedure for detecting the sealing state of a fuel cell stack according to claim 2, wherein the current draw is firstly set at a first level, it is then reduced at the same time as certain cells of the fuel cell stack start to drop in voltage, and finally it becomes zero when the voltage of the fuel cell stack approaches 0 V.

11. A procedure for detecting the state of a fuel cell stack, the fuel cell stack being formed by stacking electrochemical cells each having an anode and a cathode on respective sides of a polymeric ion-exchange membrane, the fuel cell stack having a fuel gas supply circuit on the anode side of the electrochemical cells and an oxidant gas supply circuit on the cathode side of the electrochemical cells, wherein the procedure comprises, upon each shut-down of the fuel cell stack, measuring an average of a pressure in the anode circuit and a pressure in the cathode circuit over time and, if said average drops below a threshold, activating a warning signal indicating that the fuel cell stack requires inspection.

* * * * *